United States Patent [19]
Latva-aho

[11] Patent Number: 5,832,023
[45] Date of Patent: Nov. 3, 1998

[54] SPREAD SPECTRUM RECEIVER USING ABSOLUTE-VALUE DETERMINATION FOR CODE TRACKING

[75] Inventor: Matti Latva-aho, Oulu, Finland

[73] Assignee: Nokia Mobile Phones Ltd., Salo, Finland

[21] Appl. No.: 515,324

[22] Filed: Aug. 15, 1995

[30]  Foreign Application Priority Data

Aug. 16, 1994 [FI] Finland ................... 943776

[51] Int. Cl.[6] ...................................... H04B 1/69
[52] U.S. Cl. ......................... 375/200; 375/367; 375/208
[58] Field of Search ..................... 375/200, 206, 375/208, 209, 367; 370/320, 335, 342, 515

[56]  References Cited

U.S. PATENT DOCUMENTS

| | | | |
|---|---|---|---|
| 4,726,014 | 2/1988 | Goldman et al. | 370/328 |
| 4,841,544 | 6/1989 | Nuytkens | 375/206 |
| 5,128,957 | 7/1992 | Nakagawa | 375/208 |
| 5,222,099 | 6/1993 | Hori et al. | 375/200 |
| 5,551,057 | 8/1996 | Mitra | 370/328 |
| 5,583,884 | 12/1996 | Maruyama et al. | 375/200 |
| 5,589,795 | 12/1996 | Latva-Aho | 327/553 |

*Primary Examiner*—Don N. Vo
*Attorney, Agent, or Firm*—Perman & Green, LLP

[57]  ABSTRACT

A receiver comprising a digital code tracking loop which receives an input of real and imaginary components of a received signal and in which these components are processed in different branches which each comprise a multiplier (12a–12d) and a filter (13a–13d) connected in series. To improve the characteristics of the code tracking loop in the receiver, each branch of the code tracking loop further comprises circuitry (33a–33d) for absolute-valuing the signal, the circuitry (33a–33d) being connected in series after the filters (13a–13d).

9 Claims, 4 Drawing Sheets

SPREAD SPECTRUM RECEIVER USING ABSOLUTE-VALUE DETERMINATION FOR CODE TRACKING

FIELD OF INVENTION

The present invention relates to a receiver for receiving an encoded signal. In particular, but not exclusively, to a receiver comprising a digital code tracking loop suitable for spread spectrum systems, such as Code Division Multiple Access (CDMA) systems.

BACKGROUND TO INVENTION

CDMA is a multiple access system based on a spread spectrum technique, and it has recently been put into use in cellular radio systems in addition to previously used Frequency Division Multiple Access (FDMA) and Time Division Multiple Access (TDMA). CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Band widths used in known test systems include e.g. 1.25 MHz, 10 MHz and 25 MHz. During the multiplication, the data signal spreads over the entire band to be used. All the users transmit simultaneously on the same frequency band. On each connection between a base station and a mobile station a different spreading code is used, and the signals of respective users can be distinguished from one another in the receivers on the basis of the respective spreading codes of the users. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals.

A feature of a spread spectrum system is that the receiver is able to synchronize with a received signal quickly and accurately, and continuously track the code phase of the received signal. This synchronization by the receiver is often implemented by a correlator technique utilising a code tracking loop which is synchronized and carefully tracks the phase of the spreading code of the received signal.

FIG. 1 illustrates an incoherent code tracking loop of the prior art when the system employs Binary Phase Shift Keying (BPSK) spreading modulation. The code tracking loop receives an input of real and imaginary components 10, 11 of a received signal, and the components are then multiplied in multipliers 12a–12d by an early or late code phase 22, 21 obtained from a spreading code generator 20. The signal obtained is supplied to filters 13a–13d, whose output signal is supplied further to squaring means 14a–14d, in which the effect of the data and carrier contained in the signal is eliminated by squaring the signal. The resultant signals are supplied through adders 15 to 17 to a loop filter 18, which is a low-pass filter. The filtered signal is used for controlling a voltage-controlled oscillator 19, whose output signal controls the spreading code generator 20.

In a prior art solution, data contained in a signal is thus eliminated in a code tracking loop by squaring. The problem with squaring is its complexity: it requires notably long multiplier circuits, which are not desired components in semiconductor circuits. In addition, the capacity of loops implemented by squaring is not ideal with all possible signal/noise ratios.

SUMMARY OF THE INVENTION

In a first aspect of the invention there is provided a receiver for receiving an encoded signal, comprising multiplier means for multiplying the encoded signal with a decoding signal to form a multiplied signal, filter means for filtering the multiplied signal, and code tracking means for receiving the multiplied signal from the filter means, wherein the code tracking means includes absolute-value determination means for determining the absolute-value of the multiplied signal.

In a second aspect of the invention there is provided a radio telephone comprising, an antenna for receiving radio frequency signals, a radio frequency section for down converting the received signal, analogue to digital conversion means for converting the down converted signal, and a digital code tracking loop for receiving real and imaginary components of the received signal in respective branches each including a multiplier and filter, wherein the code tracking loop further comprises absolute-value determination means for determining the absolute-value of the signal; and in a third aspect of the invention there is provided a cellular radio telephone network for providing communication over a relatively large geographical area divided into a plurality of cells, comprising cellular base stations respectively operable for at least one cell, means for controlling communication between the cellular base stations, and transceiver means associated with the respective cellular base stations, wherein the transceiver means includes a receiver comprising a digital code tracking loop for receiving real and imaginary components of the received signal in respective branches each including a multiplier and filter, wherein the code tracking loop further comprises absolute-value determination means for determining the absolute-value of the signal. In a further aspect of the invention there is provided a method of de-spreading a received signal, comprising multiplying the received signal with a spreading code, filtering the multiplied signal, determining the absolute-value of the filtered multiplied signal, and modifying the spreading code in accordance with the absolute-value.

These have the advantage of providing a receiver which has a code tracking loop that is simple to implement and which has good characteristics especially in spread spectrum systems.

In spread spectrum systems, such as CDMA systems, the signal/noise ratios are usually very small. Depending on the modulation method and channel coding, $E_b/N_o$ may even be 0 dB. As compared with earlier solutions, the performance of the synchronization block can be improved in the receiver of the invention with small signal/noise ratios. When squaring is replaced with absolute-valuing, advantages are achieved with signal/noise ratios of 0 to 6 dB, such that phase jitter may be reduced compared with techniques utilising squaring.

DETAILED DESCRIPTION OF INVENTION

In the following the invention will be described in greater detail, by way of example only, with reference to the examples illustrated by the attached drawings.

The present invention is especially well applicable to spread spectrum systems, such as CDMA systems. In CDMA systems, receivers implemented by RAKE techniques are generally used. A receiver operating on the RAKE principle comprises several branches, and each of branch can synchronize with a different signal component. The receiver can thus receive a plurality of signals simultaneously. The signals received by different branches can advantageously be combined in the receiver, whereby multipath propagation can be used as a kind of diversity method.

Each RAKE branch is thus an independent receiver and contains its own code tracking loops. In the following the structure of the receiver according to the invention will be described in greater detail, illustrating it with a RAKE receiver but without restricting it thereto. The invention can also be applied to other kinds of receivers.

Figure 3:
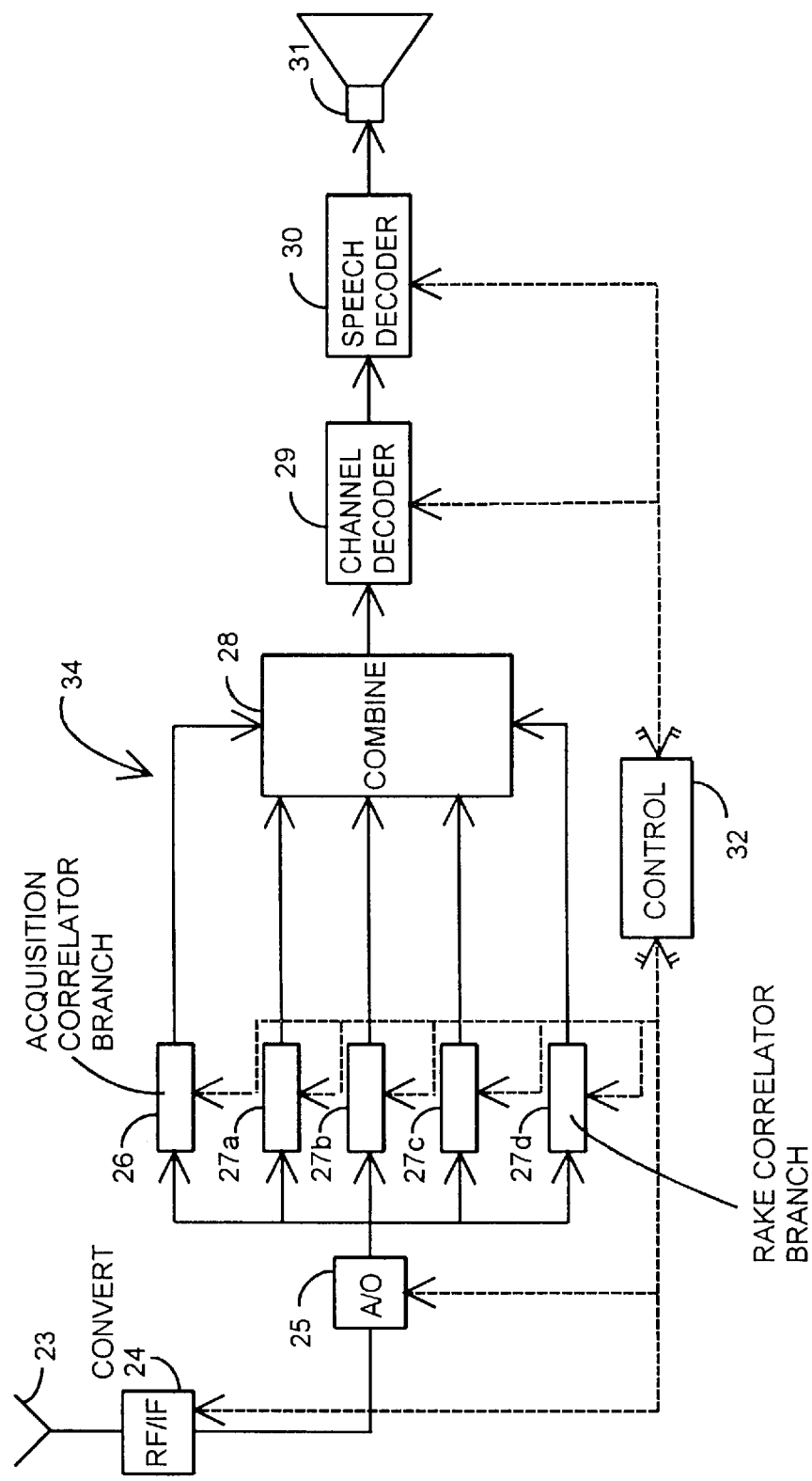
FIG. 3 shows a blocking diagram of the structure of a receiver in accordance with the invention.

FIG. 3 shows a block diagram a radio telephone 34 showing the structure of a RAKE receiver in accordance with the invention. The receiver comprises an antenna 23 by which the received signal is supplied to radio frequency sections 24, in which the signal is converted from a radio frequency to an intermediate frequency. From the RF sections 24 the signal is supplied to an A/D converter 25, in which the received analog signal is converted to digital form. The converted digital signal is supplied to RAKE correlator branches 27a–27d, each of which is synchronized with a different signal component. The digital signal is also supplied to an acquisition correlator branch 26 that looks for signal components transmitted by the desired spreading code in the received signal by measuring the impulse response of the channel, and that sets each RAKE branch in a certain code phase so that the largest multipath-propagated components can be received. The receiver of this example has four RAKE correlator branches, but their number may naturally vary with the receiver. The output signals of the correlator branches 27a–27d are supplied to a combiner 28, which advantageously combines the signal components decoded by the different branches and detects a combined signal. The detected signal is supplied to a channel decoder 29, which removes the channel coding, and to a speech decoder 30 arid a speaker 31. The receiver also comprises control means 32 controlling the operation of the above-mentioned blocks. Naturally the receiver also contains other components, such as filters, but they are not shown in the figure since they are not relevant to the instant invention.

Figure 1:
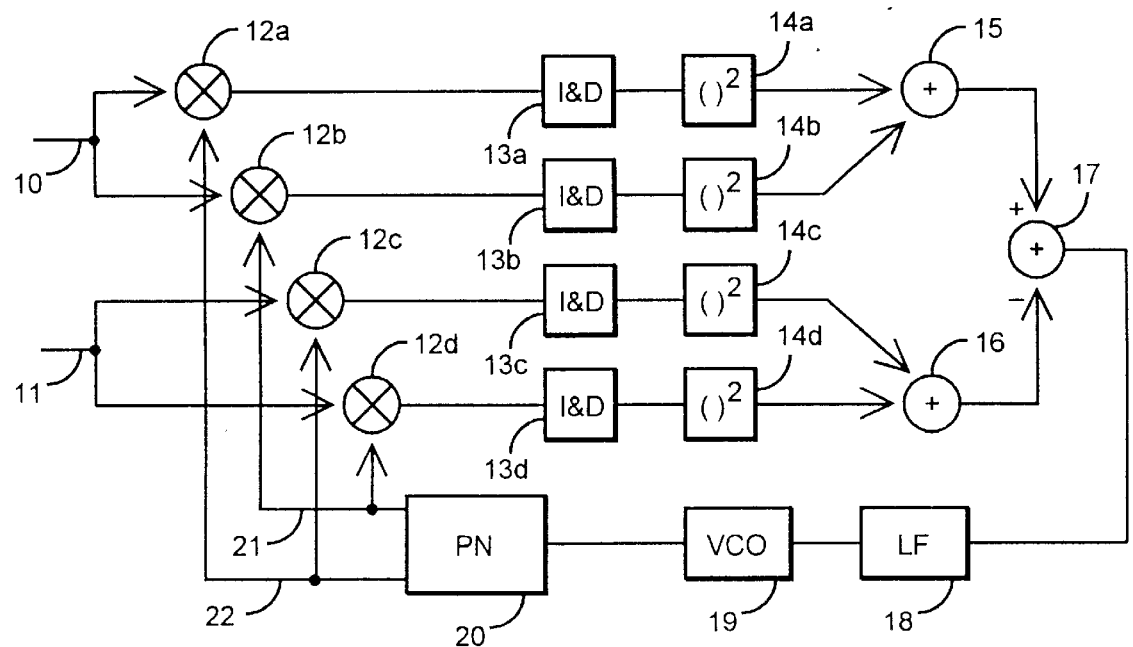
FIG. 1 illustrates the above-described example of a code tracking loop in accordance with the prior art.
Figure 4:
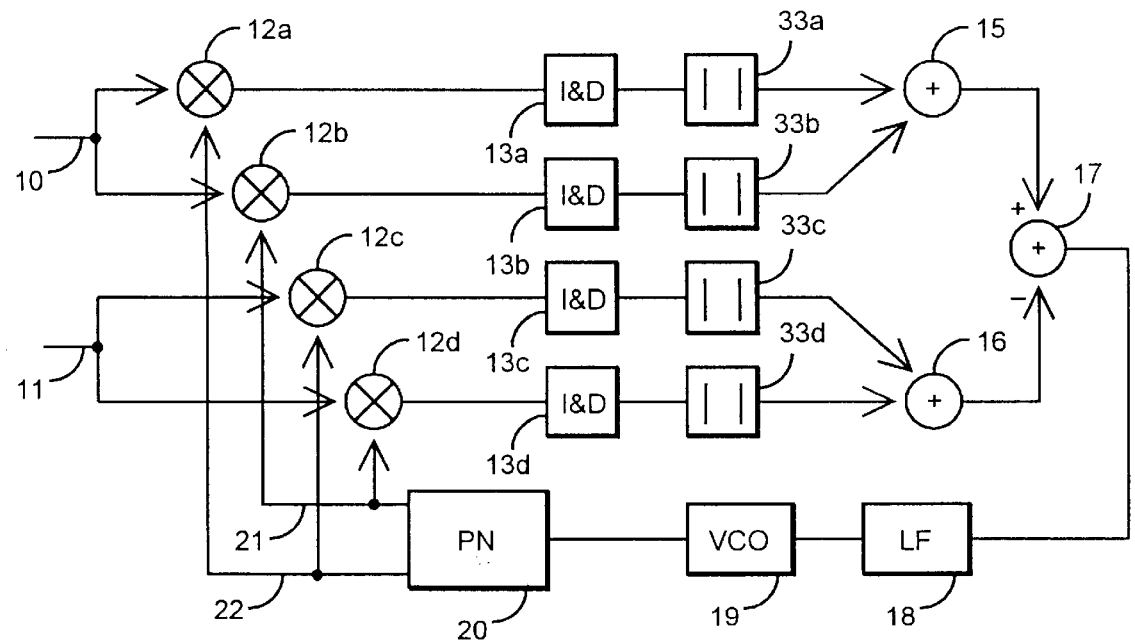
FIG. 4 illustrates an embodiment of a code tracking loop in accordance with the invention.

Each of the above-mentioned RAKE correlator branches 27a–27d is thus an independent receiver and comprises a code tracking loop for tracking a signal component comprising the desired spreading code and predetermined code phase. The acquisition branch 26 is structurally identical to the other correlator branches, but its correlators are not used for code tracking but only for acquisition. FIG. 4 illustrates the structure of a code tracking loop in accordance with the invention. The RAKE branch naturally also comprises other blocks, such as blocks assembling a spectrum and estimating a complex multiplier of a multipath-propagated signal, but in the receiver of the present invention these can be implemented in a previously known manner.

The code tracking loop receives an input of real arid imaginary components 10, 11 of a received digitalized signal. In the first multiplier 12a, the real component 10 of the signal is multiplied by an early spreading code 22 received from the spreading code generator 20, the code thus being a pseudo random spreading code with an early phase used on the desired connection that is to be demodulated. In the second multiplier, the real component 10 of the signal is multiplied by a late spreading code 21 obtained from the spreading code generator 20, the code being the desired spreading code with a late phase. Correspondingly, in the third and fourth multiplier 12c, 12d, the imaginary component 11 of the signal is multiplied by the above-mentioned early and late spreading codes 21, 22.

The signals multiplied by a spreading code are supplied further to filtering means 13a–13d. The filtered signals are supplied further to means 33a–33d, in which the filtered signals are absolute-valued to eliminate the effect of data from the signal. In code tracking, the purpose is not to demodulate actual data but only to track the desired code phase. In an advantageous embodiment of the invention, absolute valuing can be conducted simply by removing from the digital digit the bit that indicates the sign. This is much simpler than to implement the multiplier of the prior art.

The absolute-valued signals are added in such a way that the signals multiplied by an early spreading code are added in a first adder 15, and the signals multiplied by a late spreading code are added in a second adder 16. The obtained signals are supplied to a third adder 17, in which the signals multiplied by a late phase are subtracted from the signals multiplied by an early code phase. The obtained signal is supplied to a loop filter 18, in which the signal is low-pass filtered and then inputted to a voltage-controlled oscillator 19, which controls the spreading code generator 20.

Figure 2:
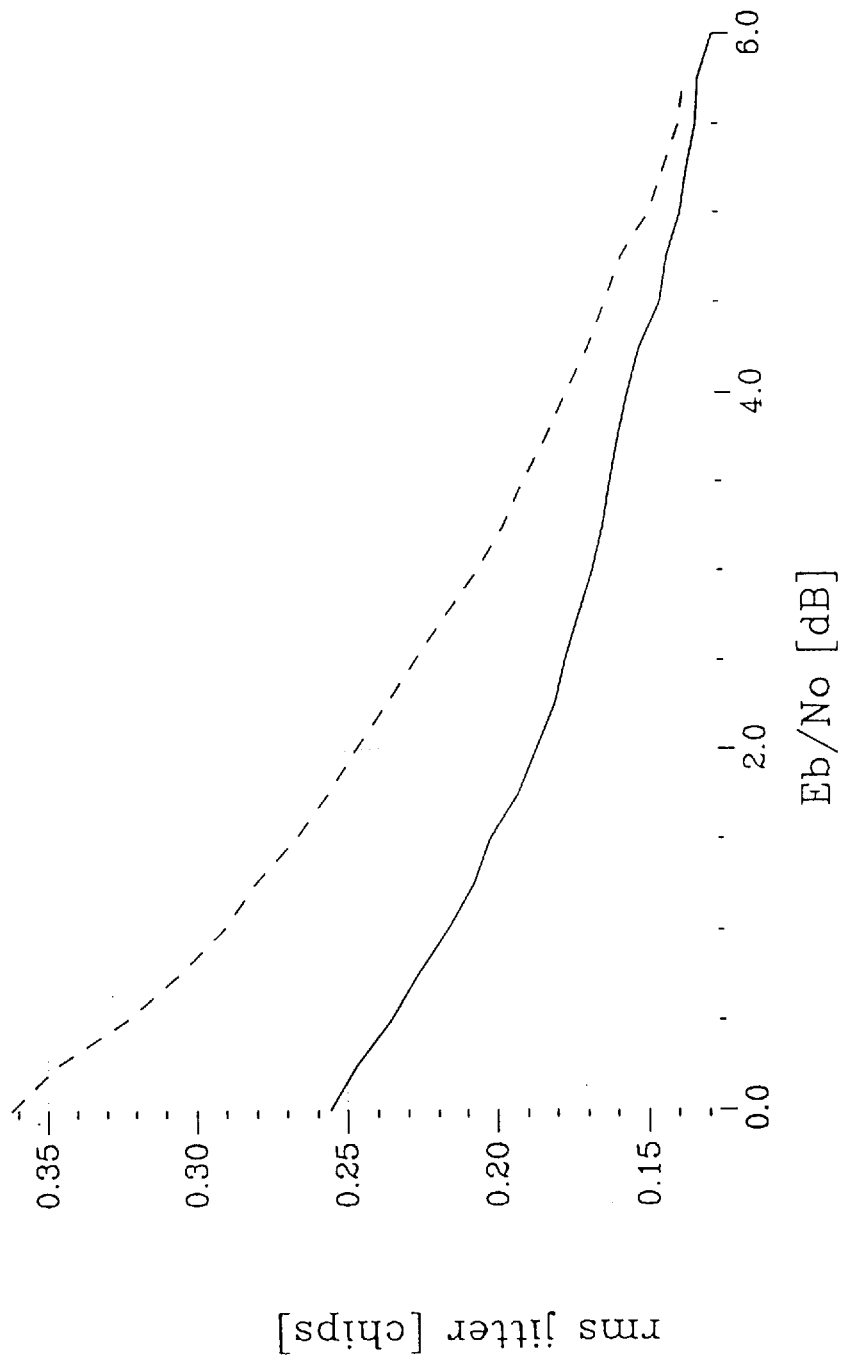
FIG. 2 illustrates the above-described example of phase jitter in a code tracking loop.

An improvement provided by the present invention is illustrated by FIG. 2, in which the horizontal axis shows the signal/noise ratio $E_b/N_o$ and the vertical axis shows the variance of phase jitter when QPSK spreading modulation and an incoherent code tracking loop are used. The dotted line shows the phase jitter achieved by squaring, and the continuous line shows the values obtained by absolute-valuing. The figure shows that when the signal/noise ratio is between 0 and 6 dB, the phase jitter is notably smaller with absolute-valuing.

Although the invention is described above with reference to an example illustrated by the drawings, it is to be understood that the invention is not limited thereto but can be modified in many ways within the inventive idea disclosed in the attached claims.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

Figure 5:
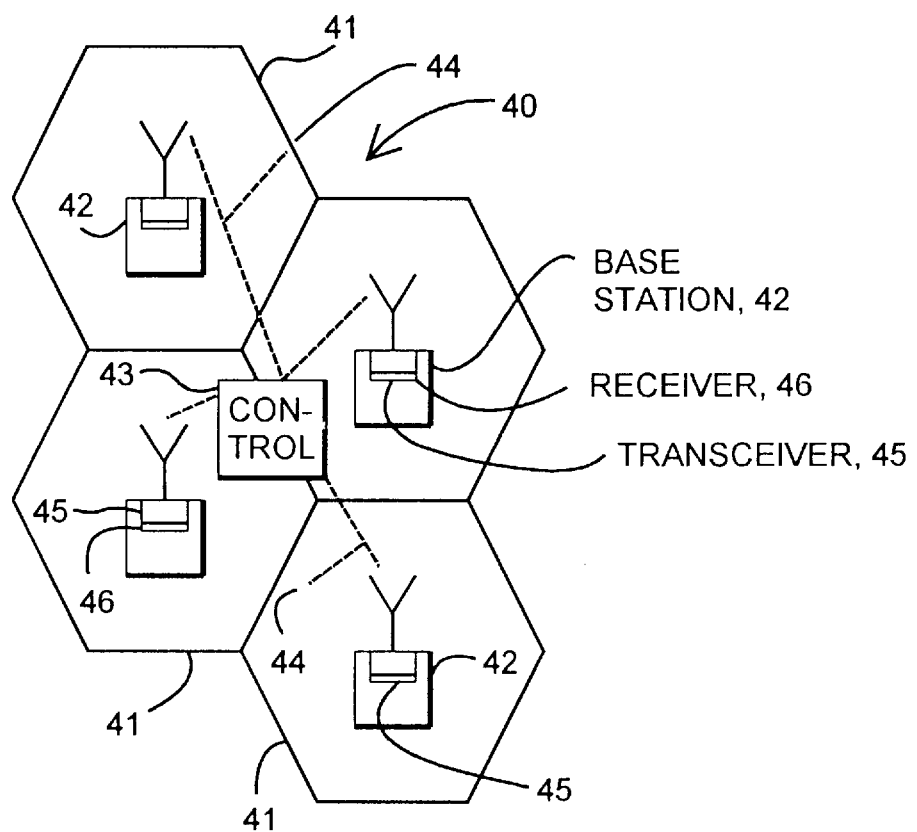
FIG. 5 shows diagrammatically a cellular radiotelephone network.

FIG. 5 shows a cellular radiotelephone network 40 which provides for communication over a relatively large geographical area divided into a plurality of cells 41. The network 40 includes a plurality of base stations 42 disposed in respective ones of the cells 41. A communication control unit 43 communicates, via communication links 44 with respective ones of the base stations 42. Each of the base stations 42 includes a transceiver 45, each of the transceivers 45 including a receiver 46 which has been described hereinabove with reference to FIGS. 3 and 4.

What I claim is:

1. A receiver for receiving an encoded signal, comprising;

multiplier means for multiplying the encoded signal with a decoding signal to form a multiplied signal, filter means for filtering the multiplied signal, and code tracking means for receiving the multiplied signal from the filter means, wherein the code tracking means includes absolute-value determination means for determining the absolute-value of the multiplied signal, said absolute value determination means being connected directly via said filter means to said multiplier means to obtain an improved signal-to-noise power ratio.

2. A receiver according to claim 1, wherein the code tracking means comprises a voltage-controlled oscillator for controlling a spreading code generator, and adapted to multiply the received signal by the output signal of the spreading code generator in the multiplier.

3. A receiver according to claim 1, adapted to receive a digitally encoded signal and wherein the code tracking means comprises a digital code tracking loop.

4. A receiver according to claim 3, adapted to receive real and imaginary components of the encoded signal for processing in separate branches each branch comprising a multiplier, a filter and a digital code tracking loop.

5. A receiver according to claim 3, wherein the receiver is implemented on the RAKE principle.

6. A receiver according to claim 3, wherein the absolute-value is determined by removing, from the digital digit, the bit that indicates the sign.

7. A radiotelephone comprising:

an antenna for receiving radio frequency signals, a radio frequency section for down converting the received signal, analogue to digital conversion means for converting the down converted signal, and a digital code tracking loop for receiving real and imaginary components of the received signal in respective branches each including a multiplier and a filter, wherein the code tracking loop further comprises absolute-value determination means for determining the absolute-value of the signal, said absolute value determination means being connected directly via said filter to said multiplier to obtain an improved signal-to-noise power ratio.

8. A cellular radio telephone network for providing communication over a relatively large geographical area divided into a plurality of cells, comprising:

cellular base stations respectively operable for at least one cell;

means for controlling communication between the cellular base stations; and transceiver means associated with the respective cellular base stations, wherein the transceiver means includes a receiver comprising a digital code tracking loop for receiving real and imaginary components of the received signal in respective branches each including a multiplier and a filter, wherein the code tracking loop further comprises absolute-value determination means for determining the absolute-value of the signal, said absolute value determination means being connected directly via said filter to said multiplier to obtain an improved signal-to-noise power ratio.

9. A method of de-spreading a received signal, comprising:

by use of a multiplying means, multiplying the received signal with a spreading code, by use of a filter means, filtering the multiplied signal, connecting absolute-value determination means directly via said filter means to said multiplying means to obtain an improved signal-to-noise power ratio, determining the absolute value of the filtered multiplied signal by said absolute-determination means, and modifying the spreading code in accordance with the absolute-value.

* * * * *